US 8,270,111 B2

(12) United States Patent
Okada et al.

(10) Patent No.: US 8,270,111 B2
(45) Date of Patent: Sep. 18, 2012

(54) PERPENDICULAR MAGNETIC RECORDING HEAD

(75) Inventors: Tomohiro Okada, Kanagawa (JP);
Masafumi Mochizuki, Tokyo (JP);
Hisashi Kimura, Kanagawa (JP);
Wataru Kimura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1221 days.

(21) Appl. No.: 11/389,216

(22) Filed: Mar. 24, 2006

(65) Prior Publication Data

US 2006/0221497 A1    Oct. 5, 2006

(30) Foreign Application Priority Data

Mar. 29, 2005   (JP) .................................. 2005-095356

(51) Int. Cl.
*G11B 5/147* (2006.01)
(52) U.S. Cl. ................................................. 360/125.12
(58) Field of Classification Search ............... 360/125.12
See application file for complete search history.

(56) References Cited

U.S. PATENT DOCUMENTS

| 6,903,900 B2 | 6/2005 | Sato et al. |
| 6,952,325 B2 | 10/2005 | Sato et al. |
| 2002/0080525 A1* | 6/2002 | Sato et al. ..................... 360/126 |
| 2002/0176214 A1 | 11/2002 | Shukh et al. |

FOREIGN PATENT DOCUMENTS

| JP | 2002-197609 A | 7/2002 |
| JP | 2003-242608 | 8/2003 |
| JP | 2004-127480 | 4/2004 |

OTHER PUBLICATIONS

Okada, Tomohiro et al., "Fabricating Narrow and Trapezoidal Main Poles for Single-Pole-Type Heads", *IEEE Transactions on Magnetics*, vol. 40, No. 4, pp. 2329-2331, Jul. 2004.
Kimura, H. et al., "Fabrication of Trapezoidal Main Pole Using Ion Milling", *The Journal of the Magnetics Society of Japan*, Vo. 28, No. 7, pp. 869-872, (2004).

* cited by examiner

*Primary Examiner* — David D Davis
(74) *Attorney, Agent, or Firm* — Zilka-Kotab, PC

(57) ABSTRACT

Embodiments of the invention provide a perpendicular magnetic recording head that causes the difference between a physical track width and an effective track width to be small. Sides of a main pole are made concave with the concave vertex on each side located close to a trailing edge of the main pole.

21 Claims, 16 Drawing Sheets

(a)

(b)

200 nm

Fig. 1 2
(a)
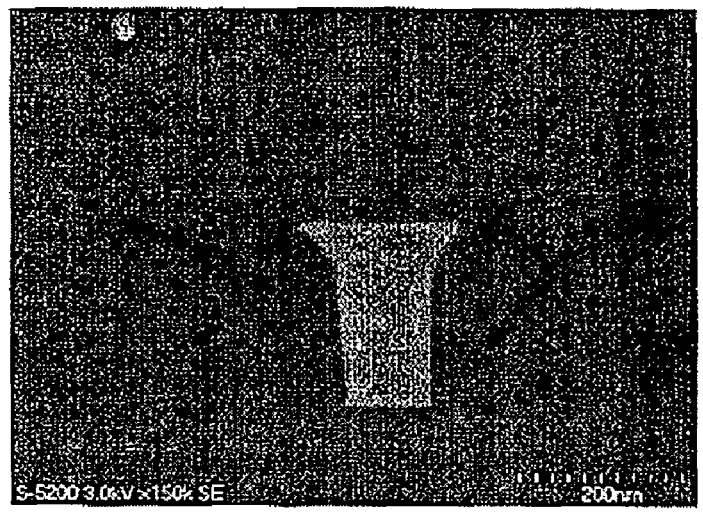
(b)
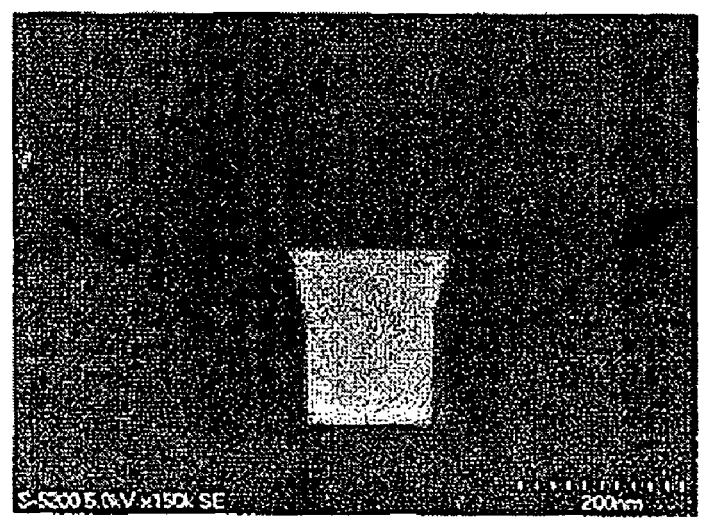

Fig. 16
(a)
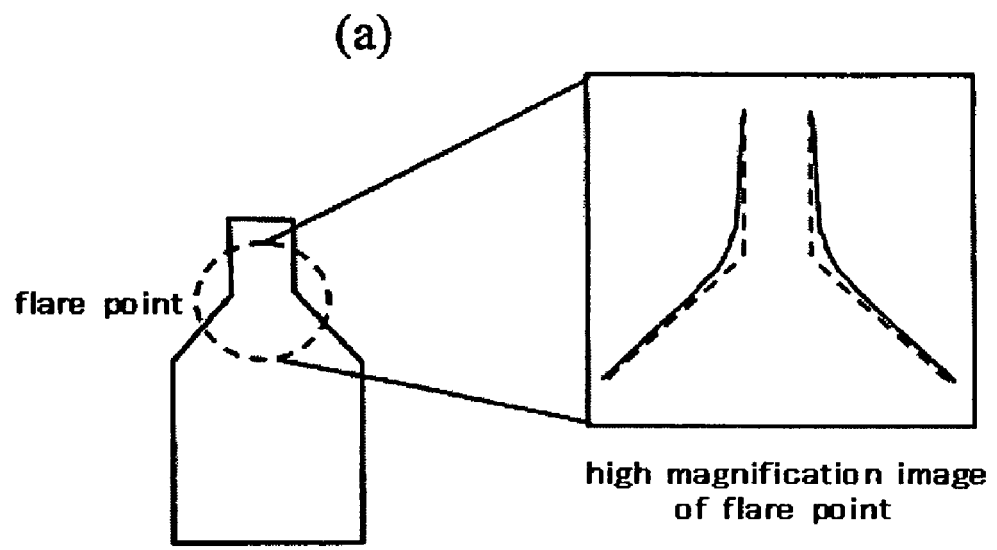
high magnification image of flare point
(b)
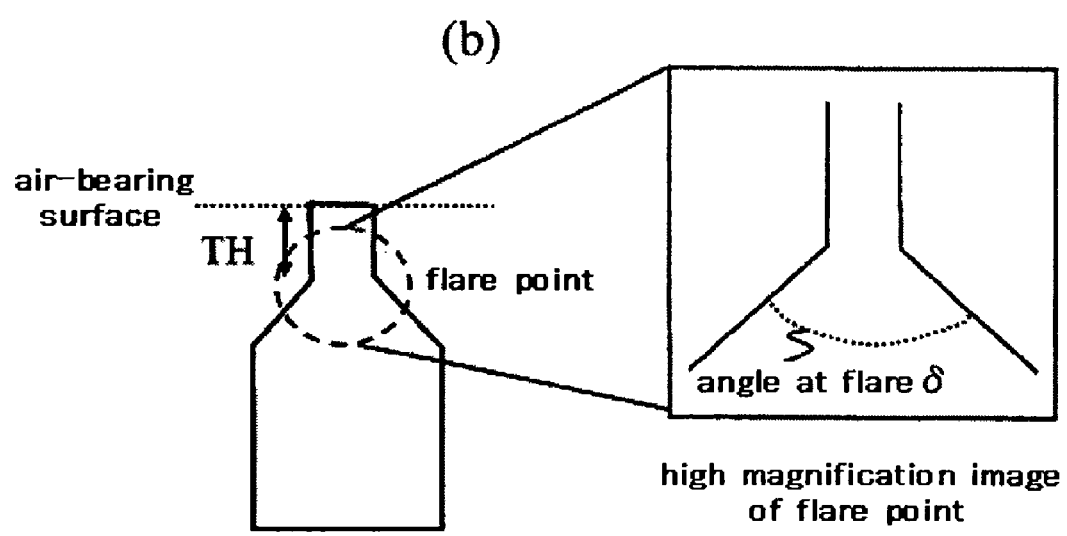
high magnification image of flare point Fig. 17
(a) 
(b) 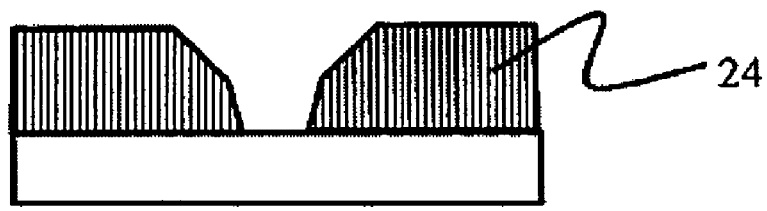
(c) 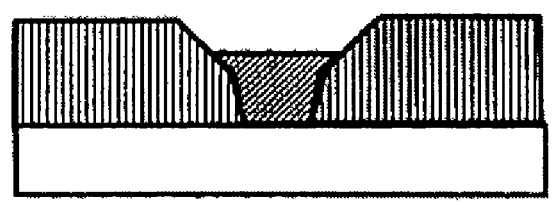
(d) 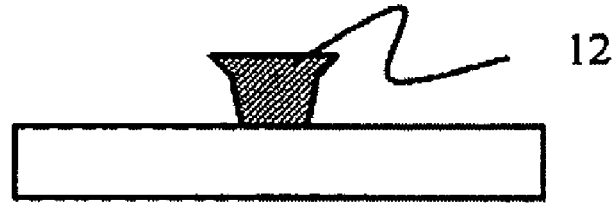

Fig. 22
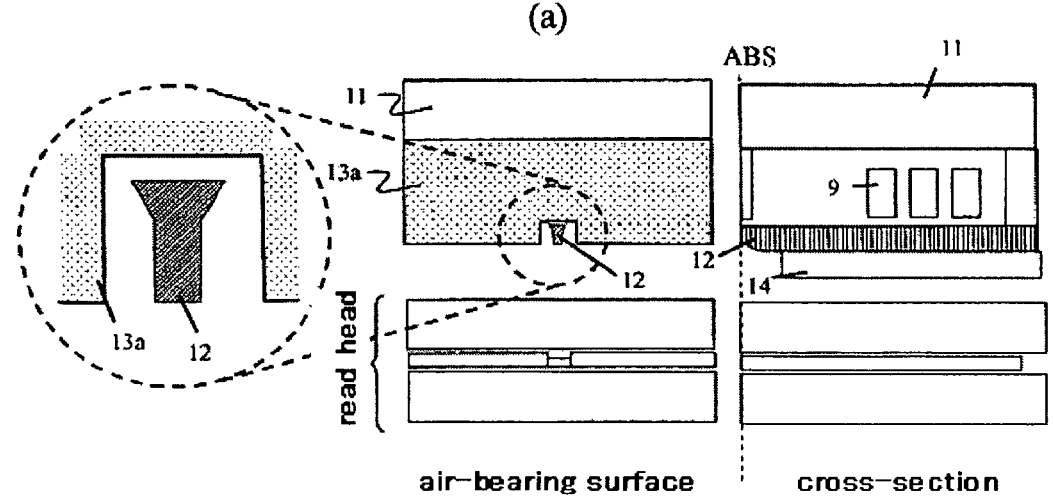
(a)
air-bearing surface    cross-section
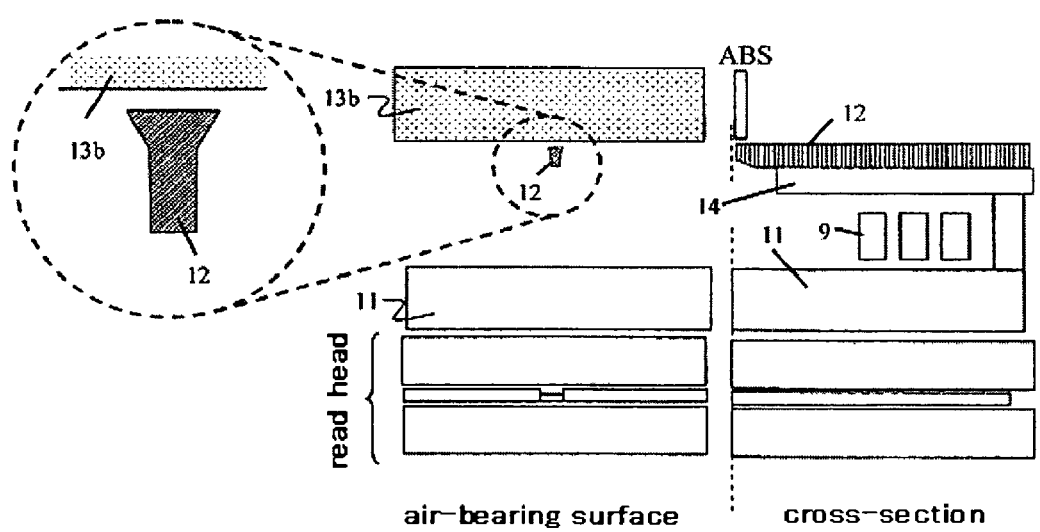
(b)
air-bearing surface    cross-section

PERPENDICULAR MAGNETIC RECORDING HEAD

CROSS-REFERENCES TO RELATED APPLICATIONS

This application claims priority from Japanese Patent Application No. JP2005-095356, filed Mar. 29, 2005, the entire disclosure of which is incorporated herein by reference.

BACKGROUND OF THE INVENTION

The present invention relates to a magnetic head for recording and reading data on and from a magnetic medium, and a method for production thereof.

In a hard disk drive, data is recorded and read on and from a recording medium using a magnetic head. To increase the recording capacity per unit area of a magnetic disk, it is necessary to increase the areal density. In the current longitudinal recording method, however, when the bit length of data to be recorded is small, the areal density cannot be increased due to thermal fluctuations of medium magnetization. A solution to the problem is to adopt perpendicular magnetic recording in which magnetic signals are recorded in a direction perpendicular to a medium. Where the perpendicular magnetic recording method is used, too, such heads as a giant magneto-resistive head (GMR head), a tunneling magneto-resistive head (TMR head) having a larger reproduction output than the GMR head, and a current perpendicular to the plane type GMR head (CPP-GMR head) for passing an electric current perpendicularly to a film surface can be used for reproduction.

For recording, on the other hand, it is necessary to use a single-pole head. For perpendicular recording, as well, to increase the areal density, it is necessary to increase the track density and the linear density. To increase the linear density, it is necessary to increase the magnetic field gradient of the write head. One way to increase the magnetic field gradient is to use a two-layer recording medium having a soft under layer. To achieve a high recording density exceeding 200 Gb/in$^2$, however, a high track density (TPI: tracks per inch) and a high linear density (BPI: bits per inch) are required. To improve the BPI value, it is necessary to increase the magnetic field gradient of the write head and the resolution of the read head. To improve the TPI value, it is necessary to reduce the track width of the head. As the track width of the head is made smaller, however, a spread of writing locations, that is, a phenomenon in which an effective track with a width larger than the actual track width (physical track width) is written on a medium has become noticeable (see FIG. 7). As a way to inhibit the spread of writing locations, it has been proposed to dispose a side shield in the vicinity of a main pole. Perpendicular magnetic recording heads provided with a side shield are disclosed in US2002/0176214A1 and JP-A No. 127480/2004.

The technical disclosures referred to by the inventor of the present invention regarding a main pole include IEEE Transactions on Magnetics, vol. 40, pp. 2329-2331 (2004) and The Journal of The Magnetics Society of Japan, Vol. 28, pp. 869-872 (2004). JP-B No. 3593312 and JP-A No. 242608/2003 include disclosures regarding the shape of a main pole. JP-B No. 3593312 discloses an example of a main pole whose width along the cross track direction increases toward its trailing edge as a measure against problems related with a skew angle. JP-A No. 242608/2003 discloses a configuration in which a main pole is divided into first and second edge portions.

BRIEF SUMMARY OF THE INVENTION

As described above, providing a side shield has been studied as a method to inhibit the spread of writing locations. Providing a side shield, however, involves an increase in the number of production processes and requires strict dimensional control. It is, therefore, very difficult to produce magnetic heads provided with a side shield. In view of the above, the present invention provides a perpendicular magnetic recording head which has a main pole having an optimized shape and which can thereby inhibit the spread of writing locations easily and effectively so as to allow a higher TPI value and a higher recording density to be achieved.

The disclosures in JP-B No. 3593312 and JP-A No. 242608/2003 concern, regarding a hard disk drive, measures against problems attributable to a skew angle and magnetic field strength. JP-B No. 3593312 discloses a main pole whose track width increases toward its trailing edge as a measure against problems attributable to a skew angle. The sides of the main pole are linear or curved for production-related reasons. Study shows a main pole having a shape as described above causes a spread of writing locations. JP-A No. 242608/2003 discloses a main pole which is divided into first and second portions in order to concentrate magnetic flux in a trailing end portion of the main pole and thereby enhance the magnetic field of the main pole. Enhancing a magnetic field excessively, however, promotes the spread of writing locations.

To achieve a higher TPI value, it is important to inhibit the spread of writing locations, that is, a phenomenon in which an effective track with a width larger than the physical track width is written on a medium. We have found that the spread of writing locations can be inhibited, without using side shield, by adopting the shape of a main pole (shape of an air bearing surface) shown in FIG. 1. A necessity of forming the air bearing surface of a main pole into an inverted trapezoidal shape has been widely known. The shape of a main pole according to the present invention is different from such an inverted trapezoidal shape. It has concavely constricted sides with concave vertexes of the sides located closer to the trailing edge than to the leading edge of the main pole.

The spread of writing locations that occurs when a main pole having an inverted trapezoidal cross-section is used can be inhibited by making the distance "a" between the trailing edge and the concave vertexes of the main pole smaller than one third of the distance "h" between the trailing edge and the leading edge of the main pole. In such an arrangement, the amount of constriction, that is, the ratio $\{(w_1-w_2)/2w_1\}$ of one half the difference between the width $w_2$ of the concave vertex portion of a main pole and the width $w_1$ at the trailing edge of the main pole to the width $w_1$ is desired to be not larger than ¼. This is because, when the constriction of a main pole is excessive, the magnetic field of the main pole decreases. According to results of our experiments conducted with a view to inhibiting the spread of writing locations, the amount of constriction is required to be at least ¹⁄₁₀. The angle θ which is formed between the trailing end surface and the side surfaces of a main pole has also been found to be an important factor in inhibiting the spread of writing locations. The reason is that the area of a magnetic portion near the trailing edge of the air bearing surface plays a part in inhibiting the spread of writing locations. According to results of our experiments, the angle θ is desired to be in the range of about 75 degrees to 45 degrees. The ratio ($TH/w_1$) of the throat height (TH) to the width ($w_1$) at the trailing edge of the main pole is 0.9 or smaller.

The shape of the main pole can be formed by ion milling or by plating using photoresist frames. When using ion milling, a process in which the ion incident angle range with respect to the circumferential direction of a wafer is limited and a process in which ions are injected in directions of 0 to 360 degrees with respect to the circumferential direction of the wafer are combined. When the ion incident angle range with respect to the circumferential direction of a wafer is limited, the ion incident angle range is to be 240 degrees at the largest. To form a main pole by plating using photoresist frames, the stepper is set, when exposing the resist, to a numerical aperture (NA) number which is larger than used in forming a conventional resist frame so as to form a resist frame such that an opening in the resist frame grows, as viewed from a side, wider upwardly from a bend point (that is, a concave vertex point). When using, for example, a KrF excimer laser stepper, the NA is set to 0.5 or so.

Using a main pole having a single magnetic layer or multiple magnetic layers, separated from each other by a non-magnetic layer, formed by a plating method or a sputtering method makes it unnecessary to use a configuration in which, as described in JP-A No. 242608/2003, a main pole is divided into two parts. A magnetic layer may be made of a material which is based on Fe (70 at %) Co and which has a high saturation magnetic flux density (Bs=2.4 T). Dividing a main pole into two parts and using a material with a Bs value lower than 2.4 T even only for the leading edge part of the main pole will result in decreasing the magnetic field of the main pole. It is desirable that a non-magnetic layer be provided on the top (at the trailing end) and at the bottom (at the leading end) of the main pole with the layer on the top being an adhesive layer and the layer at the bottom being a capping layer. The non-magnetic layers may be metallic layers or oxide layers.

The effect to inhibit the spread of writing locations obtained by adopting the shape of a main pole according to the present invention is about the same whether or not the main pole is provided with a trailing shield or a trailing side shield. Therefore, according to the present invention, a head which can inhibit the spread of writing locations and which is provided with a trailing shield or a trailing side shield can be provided.

According to the present invention, by optimizing the shape of a magnetic main pole, the effective width of a track written on a recording medium can be narrowed to achieve a higher track density and eventually a higher recording density.

BRIEF DESCRIPTION OF THE DRAWINGS

FIG. 12 shows SEM images of main poles according to the present invention.

FIG. 13 is a schematic diagram showing ion milling in which the ion incident angle with respect to the circumferential direction of a wafer is limited.

FIG. 14 is a schematic diagram showing conventional ion milling.

FIG. 16 shows schematic diagrams of flare points of main poles, one produced by ion milling in which the ion incident angle with respect to the circumferential direction of a wafer is limited and the other produced by conventional ion milling.

FIG. 17 shows cross-sectional schematic diagrams showing a process in which a magnetic head according to the present invention is produced by plating in which photoresist frames are used.

FIG. 18 is a diagram showing an example main pole with an adhesive layer and a capping layer formed at the top and the bottom, respectively.

FIG. 19 is a diagram showing an example main pole having multiple layers separated from each other by a non-magnetic layer.

FIG. 20 is a diagram showing a relationship between the ratio between the throat height (TH) and the physical track width $w_1$ and overwrite.

FIG. 21 is a diagram showing a relationship between the spread of writing locations and the ratio of $TH/w_1$.

FIG. 22 shows diagrams showing an arrangement in which a trailing side shield is provided and another arrangement in which a trailing shield is provided.

FIG. 23 shows microtrack profiles obtained using a main pole provided with a side shield and a main pole provided with no shield.

FIG. 24 shows how an adjacent track is affected when a main pole provided with a side shield is used and when a main pole provided with no shield is used.

DETAILED DESCRIPTION OF THE INVENTION

In the following, the present invention will be explained in detail with reference to drawings.

Figure 2:
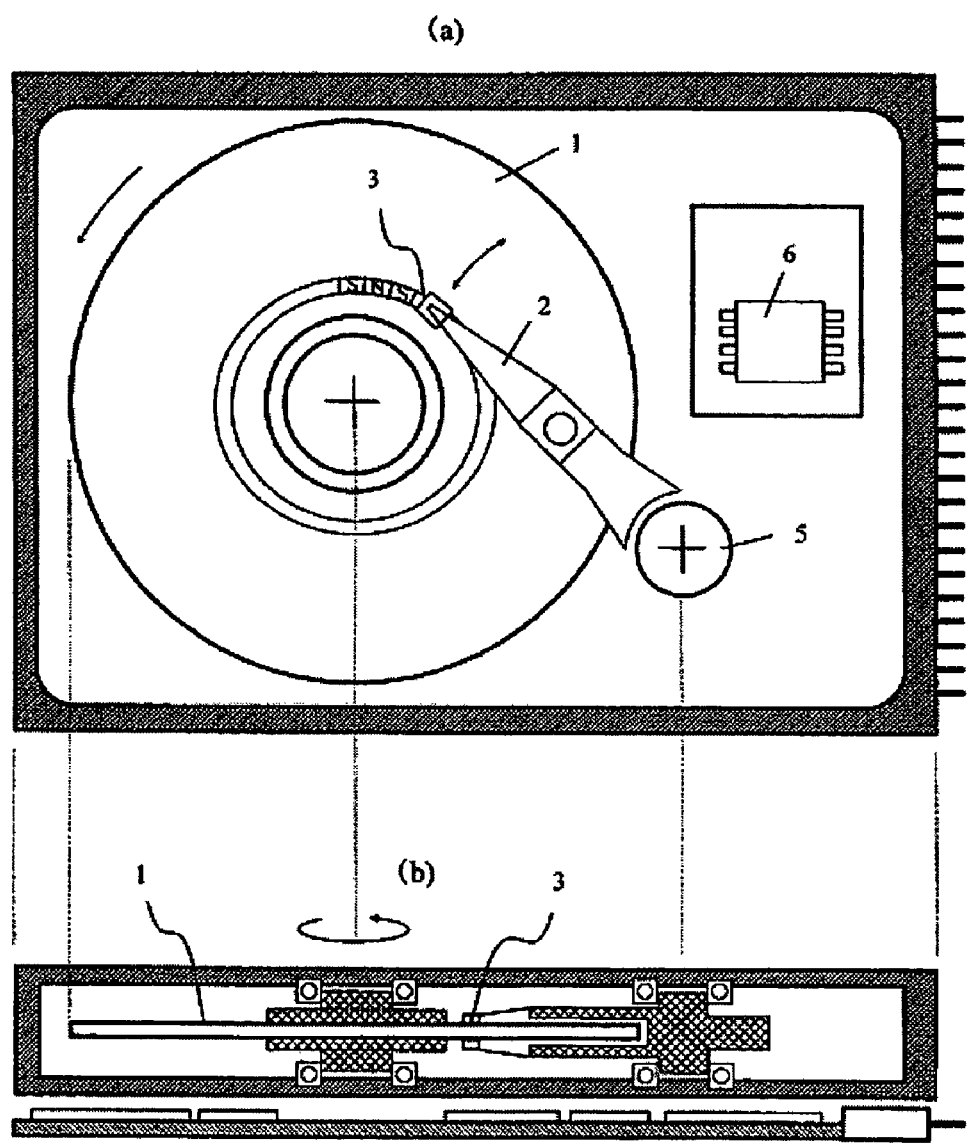
FIG. 2 is a schematic diagram of a hard disk drive according to the present invention.

FIG. 2 is a simplified diagram of a hard disk drive. Part (a) of FIG. 2 is a plan view, and part (b) of FIG. 2 is a sectional view. The hard disk drive records and reproduces a magnetic signal on and from a magnetic disk 1, which is rotatingly driven by a motor, using a magnetic head 3 fixed to an end of an arm 2. The arm 2 is, by being driven by an actuator 5 in the radial direction of the disk, positioned over a track to be recorded thereon or to be reproduced therefrom. A recording signal to drive the magnetic head 3 or a reproduction signal transmitted from the magnetic head is processed in a signal processing circuit 6.

Figure 3:
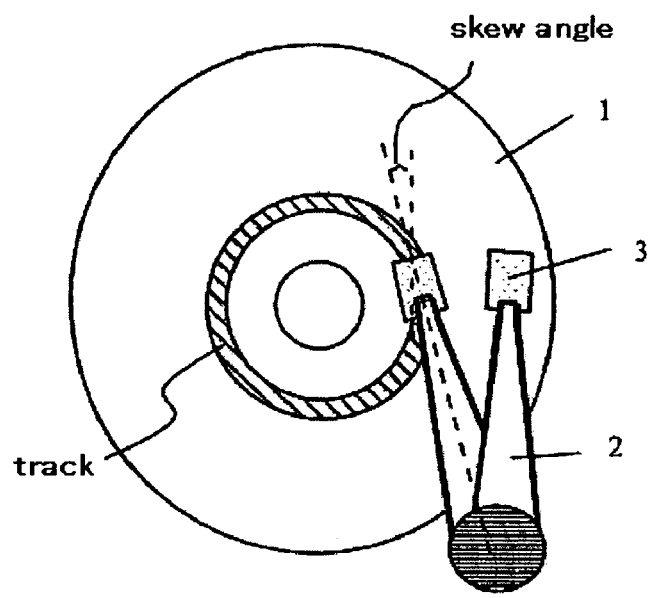
FIG. 3 is a schematic diagram of a hard disk drive in operation.

FIG. 3 is a schematic diagram showing a move, caused by swinging the arm 2, of the magnetic head 3 over the magnetic disk 1. As shown, the move generates a skew angle. The range of the skew angle is ±20°. To deal with the skew angle, the air bearing surface of the main pole of the head is required to have an inverted trapezoidal shape.

Figure 4:
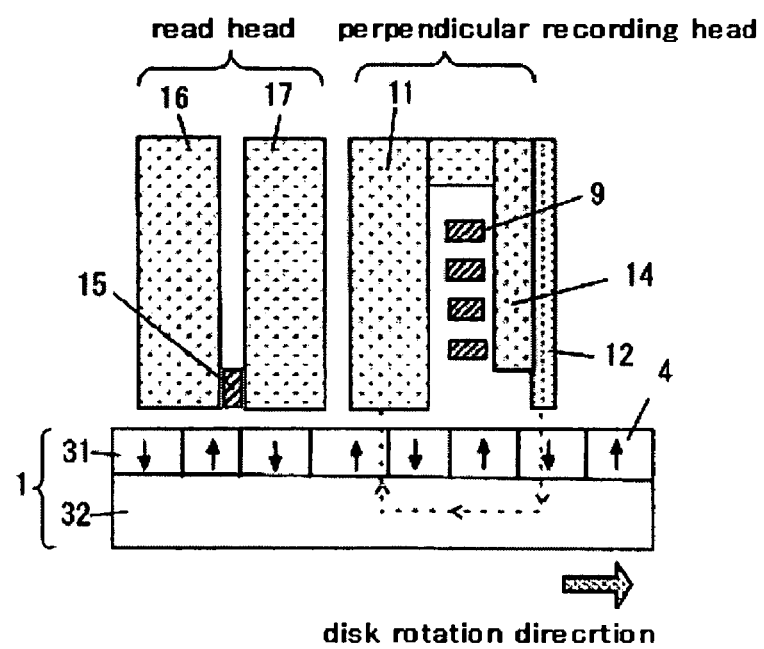
FIG. 4 is a schematic diagram of perpendicular recording.

FIG. 4 is a schematic diagram showing a perpendicular magnetic recording head and perpendicular recording. The magnetic head includes a write head and a read head. The write head generates a magnetic field used to write data in a recording layer of the magnetic disk 1. It is a single-pole head having a main pole 12, a yoke 14, a return pole 11, and a thin-film coil 9 which interlinks magnetic circuits generated by the main pole and the return pole. The read head reads data written in the recording layer of the magnetic disk 1. It has a read sensor (magneto-resistive sensor) 15, such as a GMR element, sandwiched between a pair of reproduction shields 16 and 17. A magnetic field generated by the main pole 12 of the write head forms a magnetic circuit connected, via a recording layer 31 and a soft-magnetic lining layer 32, to the return pole 11 thereby causing a magnetic pattern 4 to be recorded in the recording layer 31. At this time, the shape of the portion that comes off last from a point on the magnetic disk of the main pole 12, that is, the shapes of the top (the trailing end) and sides of the main pole 12 greatly affect the shape of the magnetic pattern.

Figure 5:
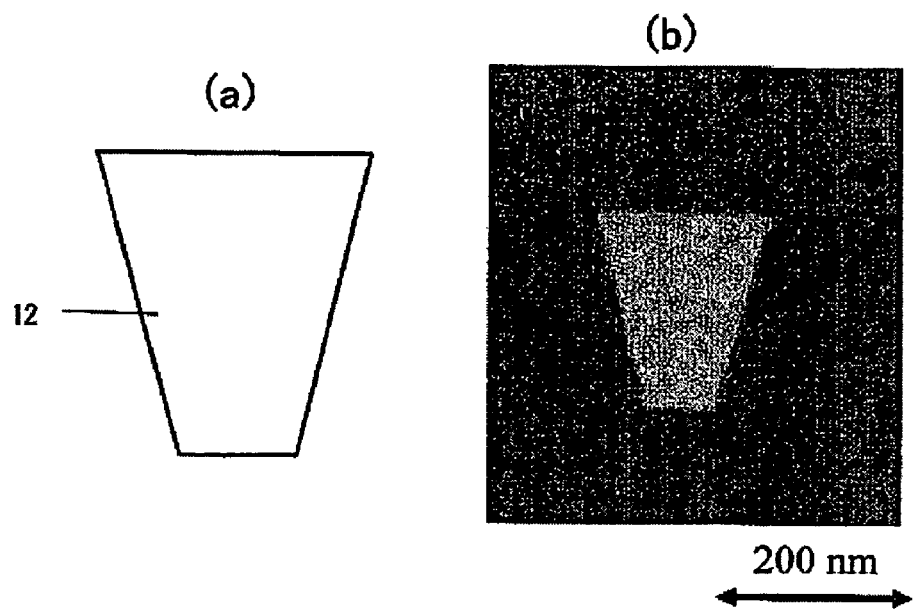
FIG. 5 shows a schematic diagram and an SEM image of a conventional type of main pole.

FIG. 5 shows a schematic diagram of a main pole having a conventional inverted trapezoidal shape and a scanning electron microscopy image (SEM image) of the main pole of an example head.

Figure 1:
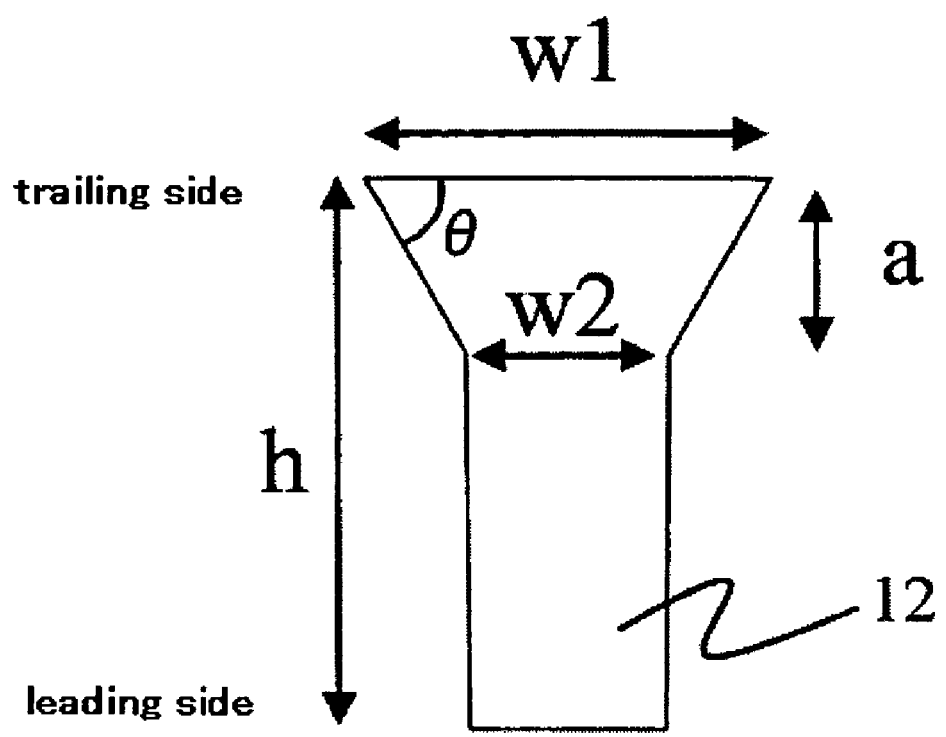
FIG. 1 is a schematic diagram of a main pole according to an embodiment of the present invention.
Figure 6:
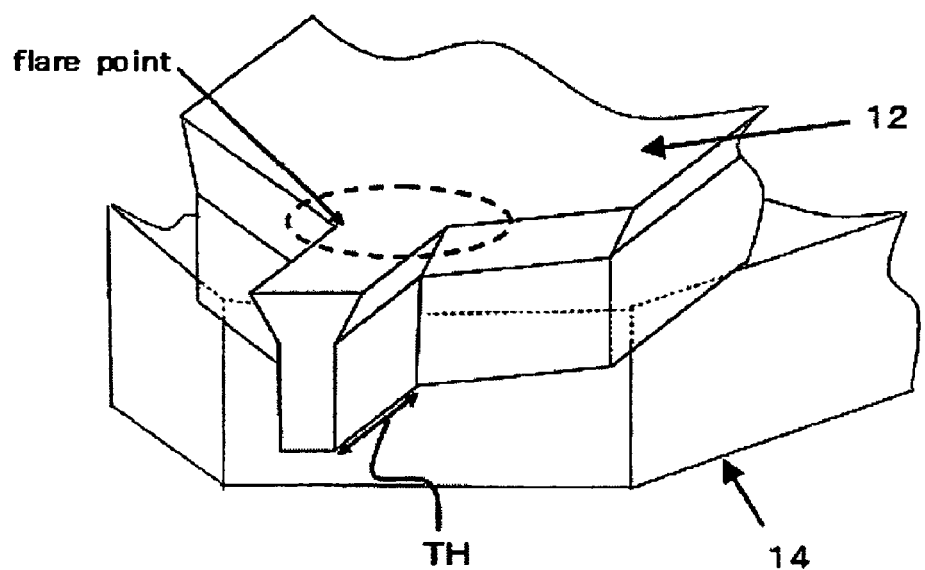
FIG. 6 is a schematic diagram of a main pole and a yoke according to an embodiment of the present invention.

FIG. 6 is a schematic diagram showing a relationship between the main pole 12 and the yoke 14 according to the present invention. The main pole 12 is formed on the yoke 14. The air bearing surface of the main pole is shaped as shown in FIG. 1. The portion close to the air bearing surface of the yoke has a narrower width than the main pole 12. This is to prevent the yoke 14 from being damaged, for example, by etching in the process of forming the main pole 12. The distance TH from the air bearing surface to what is called a flare point where the track width of the main pole widens is referred to as a throat height. In the main pole, the shape of a cross-section parallel with the air bearing surface is, even at a point close to the flare point, similar to the shape of the air bearing surface.

Figure 7:
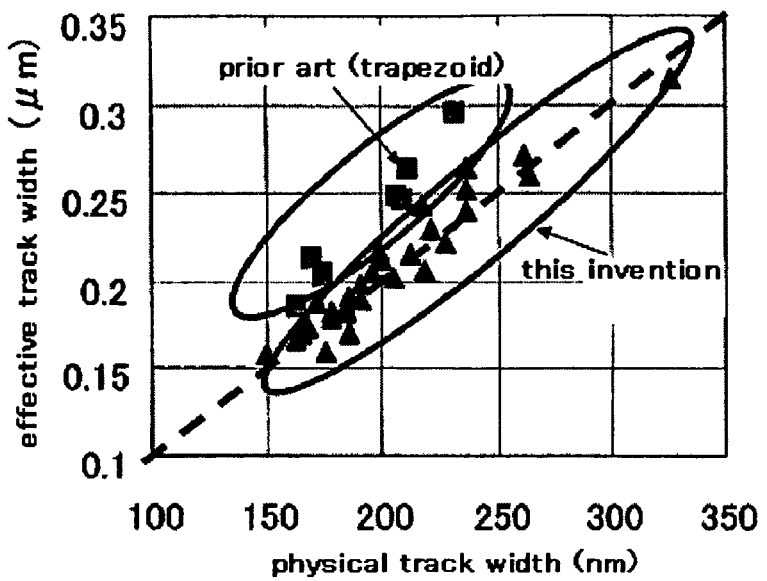
FIG. 7 is a diagram showing a relationship between physical track widths and effective track widths.

FIG. 7 is a diagram showing a relationship between physical track widths and effective track widths observed using main poles according to an embodiment of the present invention. Data obtained by using main poles having a conventionally shaped (inverted trapezoidal) air bearing surface are also shown in FIG. 7. The main poles of the heads used in the experiment had, with reference to FIG. 1, an angle θ of 45 to 75 degrees, a position of constriction a of h/3 to h/7, and an amount of constriction $\{(w_1-w_2)/2w_1\}$ of 10% to 25%. As clear from FIG. 1, the main poles according to the present invention, compared with the conventional type of main poles having an air bearing surface in an inverted trapezoidal shape, represent a great improvement in terms of the difference between a physical track width and an effective track width (the spread of writing locations). The heads of a conventional configuration (having an inverted trapezoidal shape) used in the experiment had the angle θ, as shown in FIG. 1, of 75 to 85 degrees.

Figure 8:
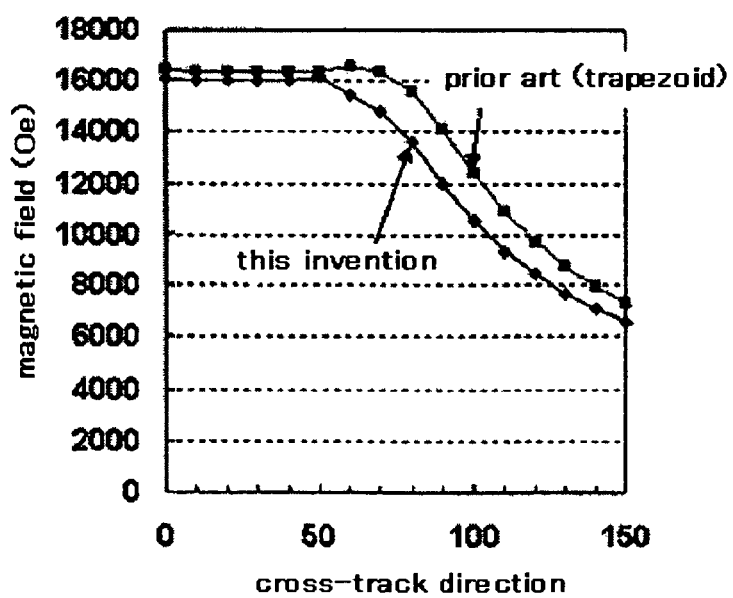
FIG. 8 is a diagram showing a profile of magnetic field strengths obtained from main poles.

FIG. 8 is a diagram showing a magnetic field distribution as simulated using a computer. The X axis represents positions in the cross track direction and the Y axis represents magnetic field strengths. In the settings made to carry out the simulation, a same physical track width was set for both the main pole according to the present invention and for the main pole of a conventional configuration (with an air bearing surface having an inverted trapezoidal shape). The main pole according to the present invention as used in the simulation had a shape represented by a $w_1$ of 175 nm, an angle θ of 60 degrees, a position of constriction "a" of h/3, and an amount of constriction of 15% of the track width at the trailing edge. The simulation confirmed that, compared with the conventional configuration, the configuration according to the present invention does not cause a magnetic field to spread much, that is, the spread of writing locations as shown in FIG. 7 is inhibited.

Figure 9:
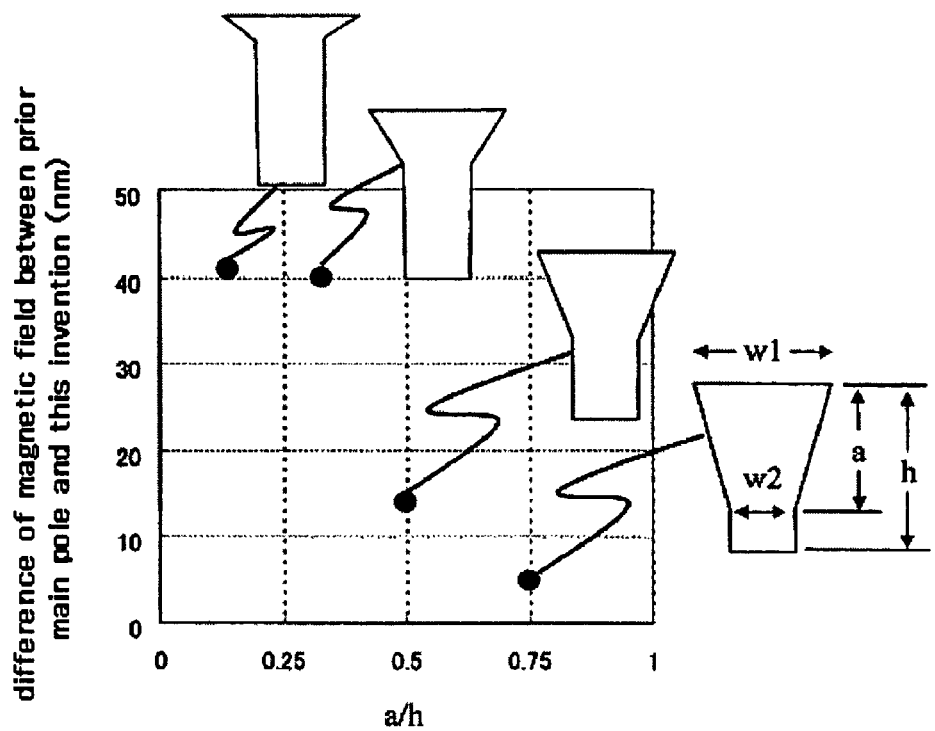
FIG. 9 is a diagram showing differences in magnetic field width between main poles according to the present invention and a conventional type of main pole (having an inverted trapezoidal shape).

Results of farther calculations made concerning the position of a concave vertex are shown in FIG. 9. The main poles used in making the calculations had a $w_1$ of 175 nm and an amount of constriction $\{(w_1-w_2)/2w_1\}$ of 15%. In FIG. 9, differences in magnetic field profiles between a main pole having a conventional shape (inverted trapezoidal shape) and main poles with a/h ratios of 1/7, 1/3, 1/2, and 3/4, respectively, are compared; namely, spreads of writing locations are compared between the different main poles. From FIG. 9, it is known that, in the case of main poles with a/h ratios of 1/2 and 3/4, respectively, the spread of writing locations is not much different from that of the main pole having a conventional configuration (with an air bearing surface having an inverted trapezoidal shape) and that, in the case of main poles with an a/h ratio of 1/3 or smaller, the spread of writing locations is much smaller than that of the main pole having the conventional configuration. The difference in the spread of writing locations between the main poles with a/h ratios of 1/7 and 1/3, respectively, is small. This is because, for the main poles with such a/h ratios, the effect of small a/h ratios is saturated with the effective track width being close to the physical track width. The reason why spreads of magnetic fields are suppressed as described above is that, with the concave vertex being brought closer to the trailing edge in the main pole configuration according to the present invention, the area of the portion close to the trailing edge of the air bearing surface of the main pole has been reduced and the magnetic field profile along the cross track direction has been greatly improved (has been narrowed) compared with when the conventionally configured main pole is used.

Figure 10:
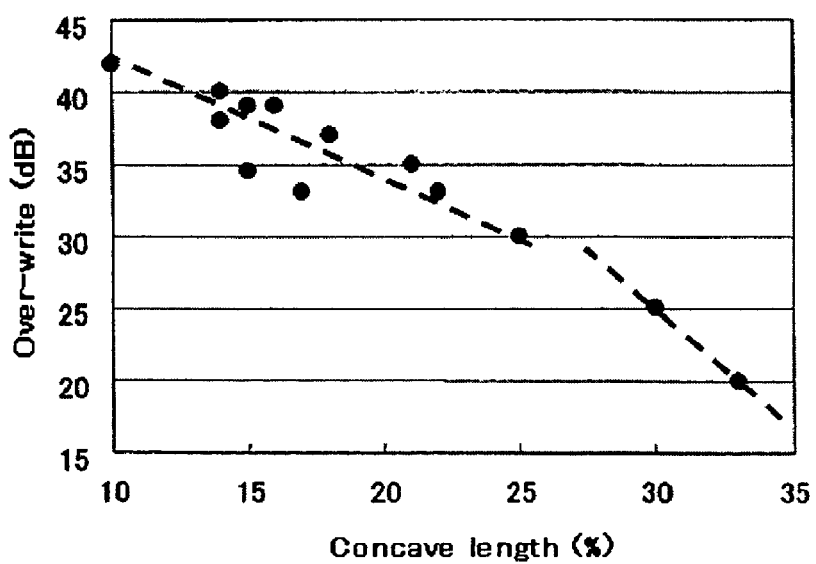
FIG. 10 is a graph showing a relationship between the amount of constriction and overwrite.

FIG. 10 is a graph showing a relationship between the amount of constriction $\{(w_1-w_2)/2w_1\}$, that is, the ratio of, with reference to FIG. 1, one half the difference between $w_2$ and $w_1$ to $w_1$ and overwrite. The heads used in the experiment had a physical track width $w_1$ of 150 nm to 200 nm, an angle θ of 45 to 75 degrees, and a concave vertex position "a" of h/3 to h/7. As shown in FIG. 10, overwrite is 30 dB or higher where the amount of constriction is 25% or lower and the overwrite sharply deteriorates when the amount of constriction increases beyond 25%. This indicates that increasing the amount of constriction decreases the magnetic field generated by the main pole to result in inadequate overwrite. Where the amount of constriction is 10% or less, writing locations spread as in a case in which a magnetic head of a conventional configuration (having an inverted trapezoidal shape) is used. Where the amount of constriction is 10% to 25%, the overwrite is satisfactory and the spread of writing locations is inhibited.

Figure 11:
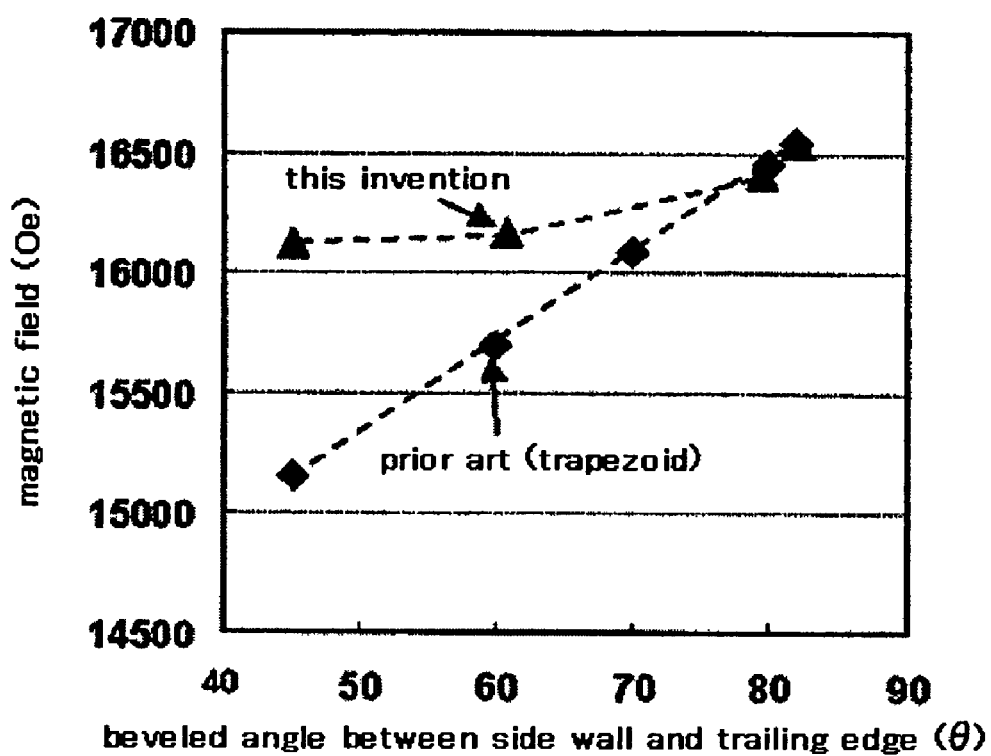
FIG. 11 is a diagram showing a relationship between an angle which is formed between the trailing end surface and the side surfaces of main poles and magnetic field strength.
Figure 1:
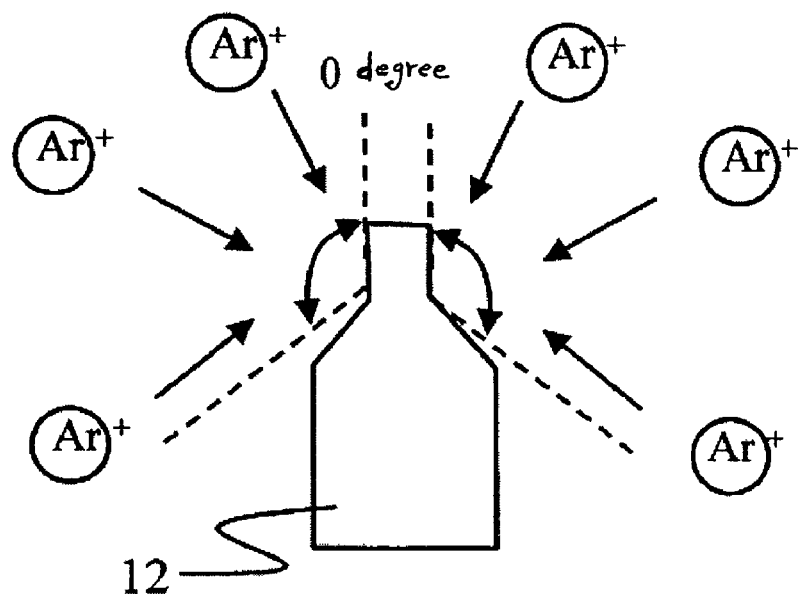
Figure 1:
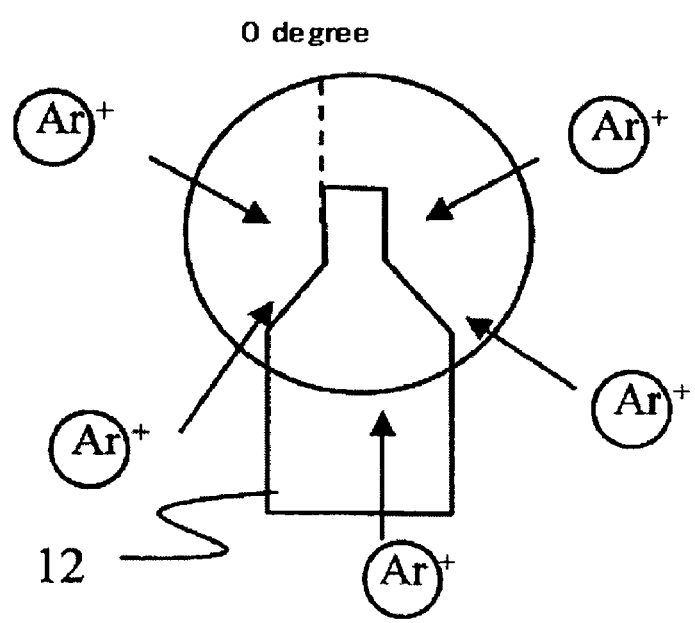

FIG. 11 is a diagram showing a relationship between an angle θ which is formed between the trailing end surface and the side surfaces of main poles and the magnetic field strength of the main poles. All samples used had a main pole width $w_1$ of 175 nm. For the conventional main pole configuration (having an inverted trapezoidal shape), the magnetic field strength decreases proportionately with the angle θ. For the main pole configuration according to the present invention, however, the decrease in magnetic field strength is small even in cases where the angle θ is large. This is because, even when the angle at the trailing edge of a main pole is increased, the area of the air bearing surface of the main pole as a whole does not decrease much. Taking into consideration both the decrease in magnetic field strength and the spread of writing locations, a desired range of the angle θ is from about 45 degrees to 75 degrees.

FIG. 12 shows SEM images of air bearing surfaces (ABS) of main poles according to the present invention. Part (a) of FIG. 12 is an SEM image of the air bearing surface of a main pole with a constriction angle θ of about 45 degrees. Part (b) of FIG. 12 is an SEM image of the air bearing surface of a main pole with a constriction angle θ of about 75 degrees.

FIG. 13 is a schematic diagram showing ion milling in which the ion incident angle with respect to the circumferential direction of a wafer is limited. FIG. 14 is a schematic diagram showing conventional ion milling in which ions are injected in directions of 0 to 360 degrees with respect to the circumferential direction of a wafer. Combining these ion milling methods makes it possible to produce main poles of the configuration according to the present invention.

Figure 15:
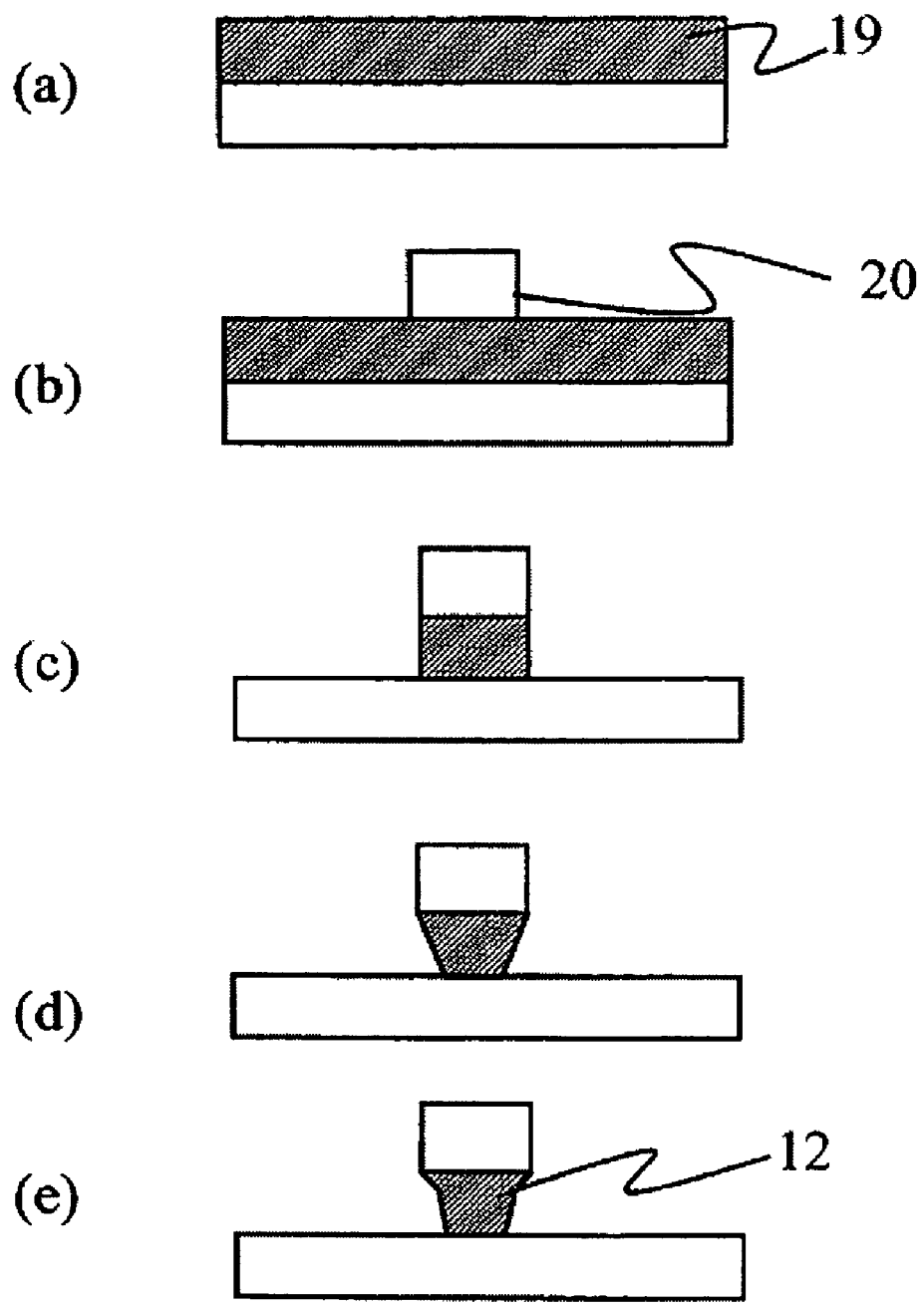
FIG. 15 shows cross-sectional schematic diagrams showing a process in which a magnetic head according to the present invention is produced using ion milling.
Figure 1:
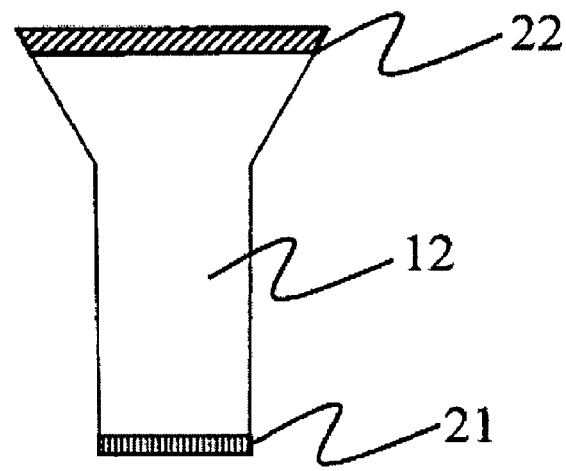
Figure 1:
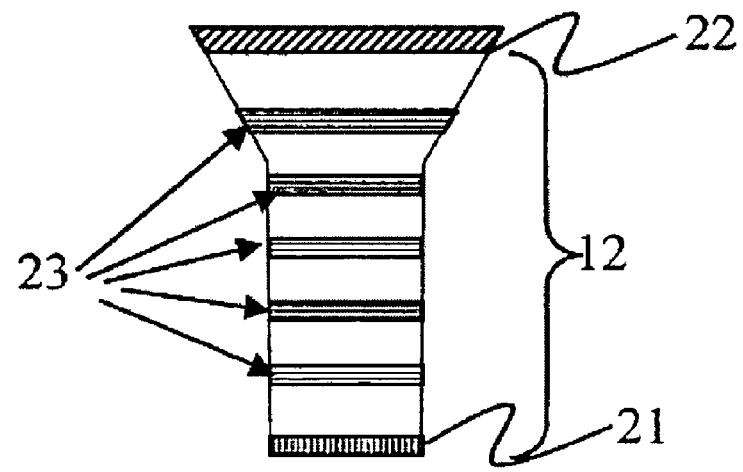
Figure 2:
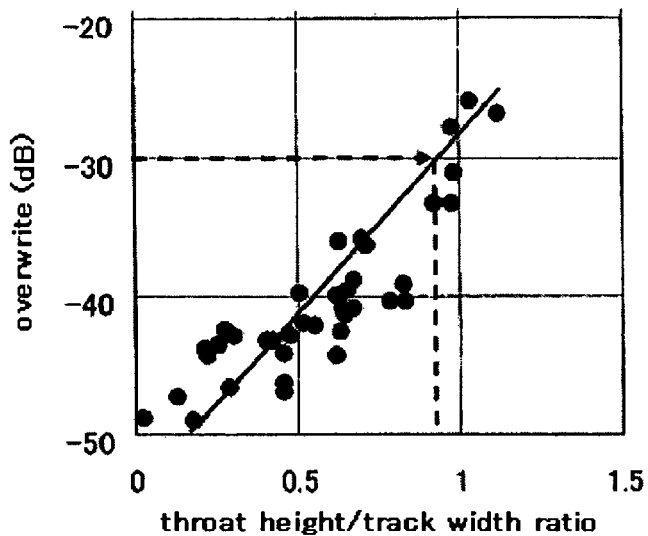
Figure 2:
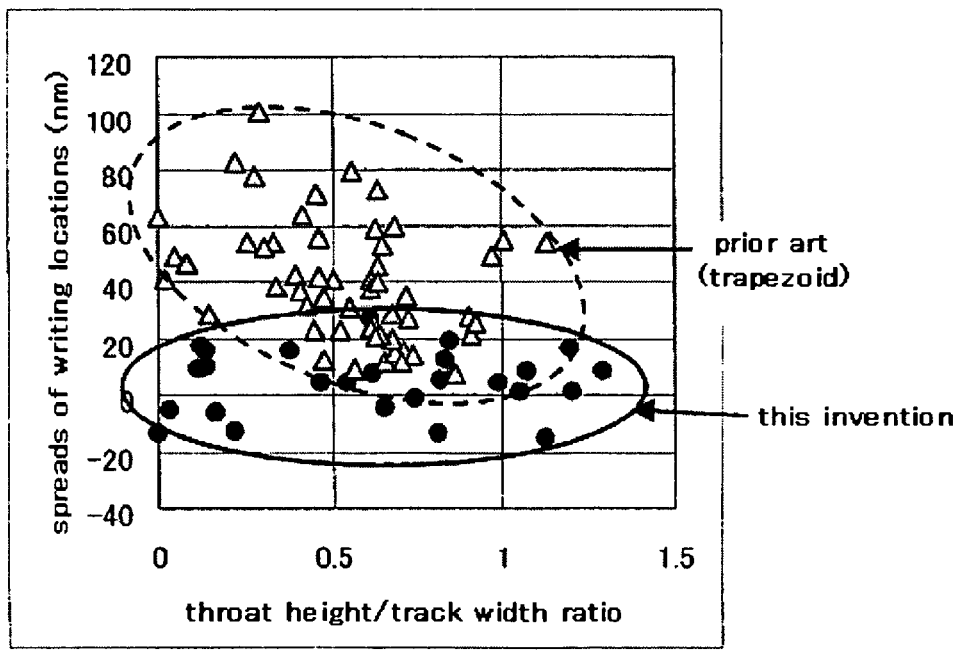
Figure 2:
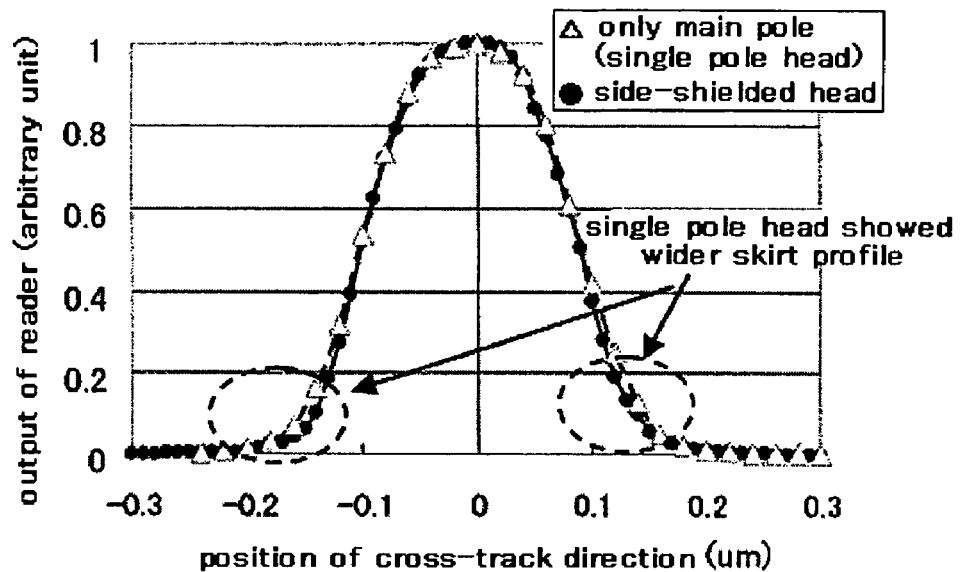
Figure 2:
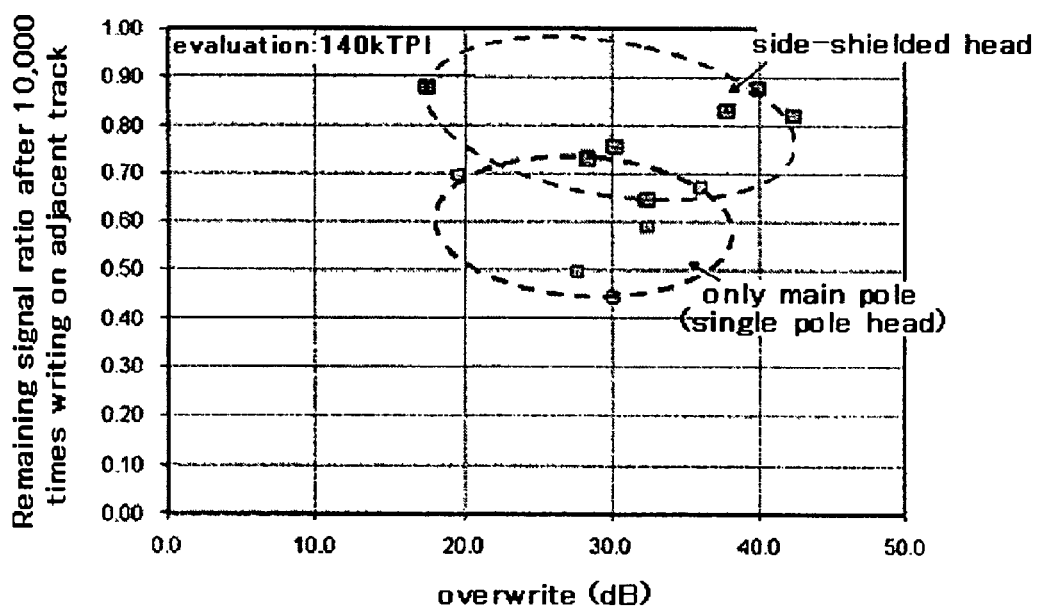

FIG. 15 shows sectional schematic diagrams showing a process in which a magnetic head according to the present invention is produced using ion milling to form a main pole. Part (a) of FIG. 15 shows a state in which a magnetic film 19 to be made a main pole has been formed on a substrate on which the read head, the return pole 11, and the coil 9 shown in FIG. 4 have been stacked. Part (b) of FIG. 15 shows a state in which a pattern has been formed on the magnetic film 19 using a mask 20. Part (c) of FIG. 15 shows a state in which the magnetic film 19 has been processed into a rectangular shape by ion milling performed by limiting, as shown in FIG. 13, the ion incident angle with respect to the circumferential direction of the wafer. In the ion milling, the ion incident angle was about 45 degrees with respect to the normal to the wafer surface and about ±120 degrees with respect to 0 degree in the circumferential direction of the wafer as shown in FIG. 13. Part (d) of FIG. 15 shows a state in which the main pole has been further processed to obtain an inverted trapezoidal cross-section by ion milling made with an ion incident angle of 60 degrees with respect to the normal to the wafer surface. The ion incident angle with respect to the circumferential direction of the wafer was about ±120 degrees the same as in the process that led to the state shown in part (c) of FIG. 15. Part (e) of FIG. 15 shows a state in which the sides of the main pole having an inverted trapezoidal shape has been processed into a concave shape by a conventional milling method as shown in FIG. 14. The conventional milling was performed with an ion incident angle of 70 degrees with respect to the normal to the wafer surface.

FIG. 16 shows diagrams for explaining the difference in shape between a main pole formed by ion milling as shown in FIG. 14 and a main pole formed by ion milling as shown in FIG. 13. Part (a) of FIG. 16 is a view from above of a main pole formed by the conventional milling method. What is called a flare point of the main pole being curved is deviated from the ideal shape shown in broken lines. An ideally shaped flare point as shown in part (b) of FIG. 16 can be obtained by limiting the ion incident angle with respect to the circumferential direction of the wafer as shown in FIG. 13. By forming the flare point into the ideal shape as shown in part (b) of FIG. 16, the physical track width can be prevented from changing even when the position of the flare point is shifted in the direction of height of the element. Using the milling method as shown in FIG. 13 is therefore essential. The throat height TH shown in part (b) of FIG. 16 is in the range of about 30 nm to 150 nm. The track width may change when the throat height is outside this range.

For the ideally shaped flare point, the flare angle δ is desired to be in the range of about 70 to 120 degrees. To obtain a strong magnetic field from the main pole, a smaller flare angle is not preferable, whereas a larger flare angle results in blocking ions from being injected and thereby causes the flare point to be formed not into the ideal shape as shown in part (b) of FIG. 16 but into a shape as shown in part (a) of FIG. 16.

FIG. 17 shows sectional schematic diagrams illustrating a process in which a magnetic head according to the present invention is produced by plating in which photoresist frames are used to form a main pole according to an embodiment. Part (a) of FIG. 17 shows a substrate on which the read head, the return pole 11, and the coil 9 shown in FIG. 4 have been stacked. Part (b) of FIG. 15 shows a state in which a resist frame 24 has been formed on the substrate after a plating base film (not shown) was formed thereon. In the process leading to this state, the resist frame is formed such that an opening in the resist frame grows, as viewed from a side, wider upwardly from bend points. To form such an opening which grows wider upwardly in the resist frame, it is necessary, when exposing the resist, to set the stepper in use to a larger-than-normal numerical aperture (NA) number. When using, for example, a KrF excimer laser stepper, the NA is set to 0.5 or so. Part (c) of FIG. 17 shows a state in which a magnetic film has been plated over the substrate using the plating base film and the resist frame shown in part (b) of FIG. 17. Part (d) of FIG. 17 shows the main pole 12 formed by removing unnecessary parts such as the resist frame and the plating base film in order.

FIG. 18 is a sectional schematic diagram showing an example main pole with an adhesive layer 21 and a capping layer 22 formed at the top and the bottom (at the leading end and the trailing end), respectively.

The adhesive layer 21 is preferably made of a non-magnetic metal or an alloy containing a non-magnetic metal. Qualitatively, easily oxidizable metals offer superior adhesiveness. Among the metals used as adhesive layer materials are, for example, Cr, Cr alloy, Ta, Ta alloy, Mo, Mo alloy, Ti, Ti alloy, Nb, Nb alloy, W, and W alloy. A film thickness of 0.5 to 5 nm is enough to obtain adequate adhesiveness for an adhesive layer. The samples shown in parts (a) and (b) of FIG. 12 have 2 nm thick adhesive layers made of NiCr and Cr, respectively.

The capping layer 22 on the main pole is formed to protect the magnetic film of the main pole 12 from being affected by oxidation and corrosion of the main pole 12. Such materials as Cr, Cr alloy, Cr oxide, Ta, Ta alloy, Ta oxide, Mo, Mo alloy, Mo oxide, Ti, Ti alloy, Ti oxide, Nb, Nb alloy, Nb oxide, W, W alloy, and W oxide which are used as adhesive layer materials can also be used as capping layer materials. Au and platinum metals (such as Os, Pt, Rh, Ru, Ir, and Pd) which are highly corrosion resistant and their alloys can also be used as capping layer materials. Such oxides as alumina and silica, or materials in which they are mixed may also be used. For the purposes of protecting the magnetic film from oxidation and corrosion during wafer processing, a capping layer thickness of about 1 to 20 nm is appropriate. Even if the thickness exceeds 20 nm, no problem is caused. The samples shown in parts (a) and (b) of FIG. 12 have 5 nm thick capping layers made of NiCr.

FIG. 19 is a sectional schematic diagram showing an example of the main pole 12 having multiple layers. Non-magnetic films 23 are inserted between magnetic layers. Materials which can be used to form the non-magnetic films include Cr, NiCr, Ru, Rh, Au, Ag, Cu, Nb, Mo, W, Ta, Re, Ir, and their alloys. The film thickness ranges from 0.5 to 3 nm. The magnetic layers sandwiching each non-magnetic layer may be antiferromagnetically or magnetostatically coupled at pattern edges, or they may be uncoupled, serving only to improve the characteristics of the magnetic layers. In the samples shown in FIG. 12, non-magnetic layers 23 made of Cr and those made of NiCr are alternately arranged. The samples therefore have a laminated structure including layers of Fe (70 at %) and Co (25 nm)/Cr (1 nm)/Fe (70 at %) and Co (25 nm)/NiCr (1 nm).

FIG. 20 is a diagram showing, on heads configured according to the present invention, a relationship between the ratio (TH/$w_1$) between the throat height (TH) and the physical track width $w_1$ and overwrite. The heads used in the experiment had a physical track width $w_1$ of 150 to 200 nm, an amount of constriction of 10 to 25%, an angle θ which is formed between the trailing end surface and the side surfaces of 45 to 75 degrees, and a concave vertex position "a" of h/3 to h/7. When the ratio (TH/$w_1$) becomes smaller (throat height becomes shorter), the overwrite improves (value becomes smaller). As the overwrite of 30 dB or below is required, the TH/$w_1$ value is required to be about 0.9 or lower.

FIG. 21 is a diagram showing a relationship between the spread of writing locations, the throat height (TH) and the physical track width ($w_1$). Data taken on heads with an air bearing surface having a conventional inverted trapezoidal shape are also shown in FIG. 21. The heads made according to the present invention and used in the experiment had a physical track width $w_1$ of 150 to 200 nm, an amount of constriction of 10 to 25%, an angle θ which is formed between the trailing end surface and the side surfaces of 45 to 75 degrees, and a concave vertex position "a" of h/3 to h/7. Heads of the conventional configuration (having an inverted trapezoidal shape) used in the experiment had a physical track width $w_1$ of 150 to 200 nm and an angle θ, as shown in FIG. 1, of 75 to 85 degrees. As is clear from FIG. 21, the magnetic heads according to the present invention do not cause writing locations to spread even when the throat height is short, whereas the heads of the conventional configuration (having an inverted trapezoidal shape) cause writing locations to spread widely.

Based on FIGS. 20 and 21, it is known that the main pole configuration according to the present invention makes it possible to inhibit the spread of writing locations by shortening the throat height even in a case in which the magnetic field recorded by the main pole is enhanced (even in a region where good overwrite performance is obtained as shown in FIG. 20).

Part (a) of FIG. 22 is a diagram for explaining a main pole according to the present invention provided with a trailing side shield 13a. Part (b) of FIG. 22 is a diagram for explaining a main pole according to the present invention provided with a trailing shield 13b. In the arrangement shown in part (a) of FIG. 22, the main pole is located closer to the reproduction shield than to the return pole. In the arrangement shown in part (b) of FIG. 22, the return pole is located closer to the read head shield than to the main pole. Regardless of the positional relationship between the main pole and the return pole, either a trailing shield or a trailing side shield may be adopted. The effect of adopting the main pole shape according to the present invention, that is, the effect to inhibit the spread of writing locations is about the same whether the main pole is provided with either a trailing shield or a trailing side shield or it is provided with neither of the shields.

When the main magnetic pole is provided with a side shield, the effect to inhibit the spread of magnetic fields may be enhanced. FIG. 23 shows so-called microtrack profiles, that is, profiles of a signal written on a medium. A microtrack profile obtained using a head having a main pole shaped according to the present invention ($w_1$=175 nm, θ=60 degrees, position of constriction a=h/3, and amount of constriction=15%) and a microtrack profile obtained using the same head but provided with a trailing side shield are both shown. In the case of the head provided with a trailing side shield, the distance between the main pole and the shield is 150 nm both in the trailing direction and in the cross-track direction. Looking at foot portions of the profiles shown in FIG. 23, it is observed that the profile obtained using the main magnetic pole with no shield is more widened. This is shown more noticeably when write operations are performed on a track a plural number of times and how an adjacent track is affected is observed.

FIG. 24 shows results of checking signals recorded on a track on a magnetic disk with a track density of 140k tracks per inch after 10,000 write operations are performed on a directly adjacent track. The heads used in the experiments had a physical track width $w_1$ of 150 nm, an amount of constriction of 10 to 25%, an angle θ which is formed between the trailing end surface and the side surfaces of 45 to 75 degrees, and a concave vertex position a of h/3 to h/7. The distance between the main pole and the shield is 150 nm both in the trailing direction and in the cross-track direction. It is observed that the residual rate of signals on a track is higher, that is, the track is less affected by writing operations on an adjacent track, when the head provided with a side shield is used. This indicates that using a side shield reduces the spread of magnetic fields and confirms that combined use of a main pole having a shape according to the present invention and a side shield is advantageous in achieving a higher track density (TPI).

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A perpendicular magnetic recording head comprising a read head which has a magneto-resistive sensor and a write head which has a main pole and a return pole,
    wherein each side in a cross track direction of the main pole is inwardly concave, and
    wherein an inequality of the form a <h/3, where "a" is a distance between a trailing edge and a concave vertex of the each side and h is a distance between the trailing edge and a leading edge, is satisfied,
    wherein an inequality of the form $w_1/10 < (w_1 - w_2)/2 < w_1/4$, where $w_1$ is a width at the trailing edge of the main pole and $w_2$ is a width of the concave vertex portion of the main pole, is satisfied.

2. The perpendicular magnetic recording head according to claim 1, wherein an air bearing surface of the main pole has a length extending from the leading edge of the main pole to the concave vertex portion where a width of the main pole at the air bearing surface in the cross-track direction does not increase along the length.

3. The perpendicular magnetic recording head according to claim 1, wherein an angle θ formed between a trailing end surface and a side surface of the main pole is in a range from about 75 degrees to 45 degrees.

4. The perpendicular magnetic recording head according to claim 1, wherein a non-magnetic layer is provided as an adhesive layer under a leading edge of the main pole and another non-magnetic layer is provided as a capping layer above a trailing end of the main pole.

5. The perpendicular magnetic recording head according to claim 1, wherein the main pole comprises laminated layers of magnetic material being separated from each other by a non-magnetic layers.

6. The perpendicular magnetic recording head according to claim 1, wherein a ratio of a throat height of the main pole to the width $w_1$ at the trailing edge of the main pole is about 0.9 or smaller.

7. The perpendicular magnetic recording head according to claim 1, wherein a magnetic shield facing, via a non-magnetic gap, the trailing end and sides of the main pole is provided.

8. The perpendicular magnetic recording head according to claim 1, wherein a magnetic shield facing, via a non-magnetic gap, the trailing end of the main pole is provided.

9. A hard disk drive, comprising a magnetic medium, a motor to rotatingly drive the magnetic medium, and a perpendicular magnetic recording head as recited in claim 1.

10. A hard disk drive comprising a magnetic medium, a motor to rotatingly drive the magnetic medium, a magnetic head to write and read information on and from the magnetic medium, and a head driving section to drive the magnetic head relative to the magnetic medium,
wherein the magnetic head comprises a read head which has a magnetoresistive sensor and a write head which has a main pole and a return pole, each side in a cross track direction of the main pole being inwardly concave and an inequality of the form $a < h/3$, where "a" is a distance between a trailing edge and a concave vertex of the each side of the main pole and h is a distance between the trailing edge and a leading edge of the main pole, being satisfied,
wherein an inequality of the form $w_1/10 < (w_1-w_2)/2 < w_1/4$, where $w_1$ is a width at the trailing edge of the main pole and $w_2$ is a width of the concave vertex portion of the main pole, is satisfied.

11. The hard disk drive according to claim 10, wherein the main pole comprises:
a rectangular or trapezoidal lower portion adjacent a leading edge of the main pole, the lower portion having straight side edges extending between leading and trailing sides of the lower portion;
a trapezoidal upper portion having a leading and trailing parallel sides and straight side edges extending between the leading and trailing parallel sides,
wherein the trailing side of the upper portion is wider than the leading side of the upper portion, and wherein the leading side of the upper portion is substantially coincident with the trailing side of the lower portion,
wherein corners are formed on each side of the main pole at an intersection of the straight side edges of the upper and lower portions at the concave vertex portion.

12. The hard disk drive according to claim 10, wherein an angle θ formed between a trailing end surface and a side surface of the main pole is in a range from about 75 degrees to 45 degrees.

13. The hard disk drive according to claim 10, wherein a nonmagnetic layer is provided as an adhesive layer in a leading edge portion and another nonmagnetic layer is provided as a capping layer in a trailing end portion.

14. The hard disk drive according to claim 10, wherein the main pole comprises a single layer of plated film or sputtered film or laminated layers of the same being separated from each other by a non-magnetic layer.

15. The hard disk drive according to claim 10, wherein a ratio of a throat height of the main pole to the width $w_1$ at the trailing edge of the main pole is about 0.9 or smaller.

16. The hard disk drive according to claim 10, wherein a magnetic shield facing, via a non-magnetic gap, the trailing end and sides of the main pole is provided.

17. The hard disk drive according to claim 10, wherein a magnetic shield facing, via a non-magnetic gap, the trailing end of the main pole is provided.

18. A perpendicular magnetic recording head, comprising:
a main pole tip having a cross section at an air bearing surface, the main pole comprising:
a rectangular or trapezoidal lower portion adjacent a leading edge of the main pole, the lower portion having straight side edges extending between leading and trailing sides of the lower portion;
a trapezoidal upper portion having a leading and trailing parallel sides and straight side edges extending between the leading and trailing parallel sides,
wherein the trailing side of the upper portion is wider than the leading side of the upper portion, and wherein the leading side of the upper portion is substantially coincident with the trailing side of the lower portion,
wherein a vertex is formed on each side of the main pole at an intersection of the straight side edges of the upper and lower portions.

19. The perpendicular magnetic recording head according to claim 18, wherein an inequality of the form $w_1/10 < (w_1-w_2)/2 < w_1/4$, where $w_1$ is a width at the trailing edge of the main pole and $w_2$ is a width of the concave vertex portion of the main pole, is satisfied.

20. A hard disk drive, comprising a magnetic medium, a motor to rotatingly drive the magnetic medium, and a perpendicular magnetic recording head as recited in claim 18.

21. A perpendicular magnetic recording head, comprising:
a main pole tip having a cross section at an air bearing surface, the main pole comprising:
a rectangular or trapezoidal lower portion adjacent a leading edge of the main pole, the lower portion having straight side edges extending between leading and trailing sides of the lower portion;
a trapezoidal upper portion having a leading and trailing parallel sides and straight side edges extending between the leading and trailing parallel sides,
wherein the trailing side of the upper portion is wider than the leading side of the upper portion, and wherein the leading side of the upper portion is substantially coincident with the trailing side of the lower portion,
wherein corners are formed on each side of the main pole at an intersection of the straight side edges of the upper and lower portions,
wherein each side in a cross track direction of the main pole is inwardly concave, and wherein an inequality of the form $a < h/3$, where "a" is a distance between a trailing side of the substantially trapezoidal upper portion and a concave vertex of the each side and h is a distance between the trailing edge and a leading edge is satisfied.

* * * * *